March 23, 1954
H. C. RIEMANN
2,673,055
ATTACHMENT FOR AUTOMOBILE ACCESSORIES
Filed Jan. 18, 1950
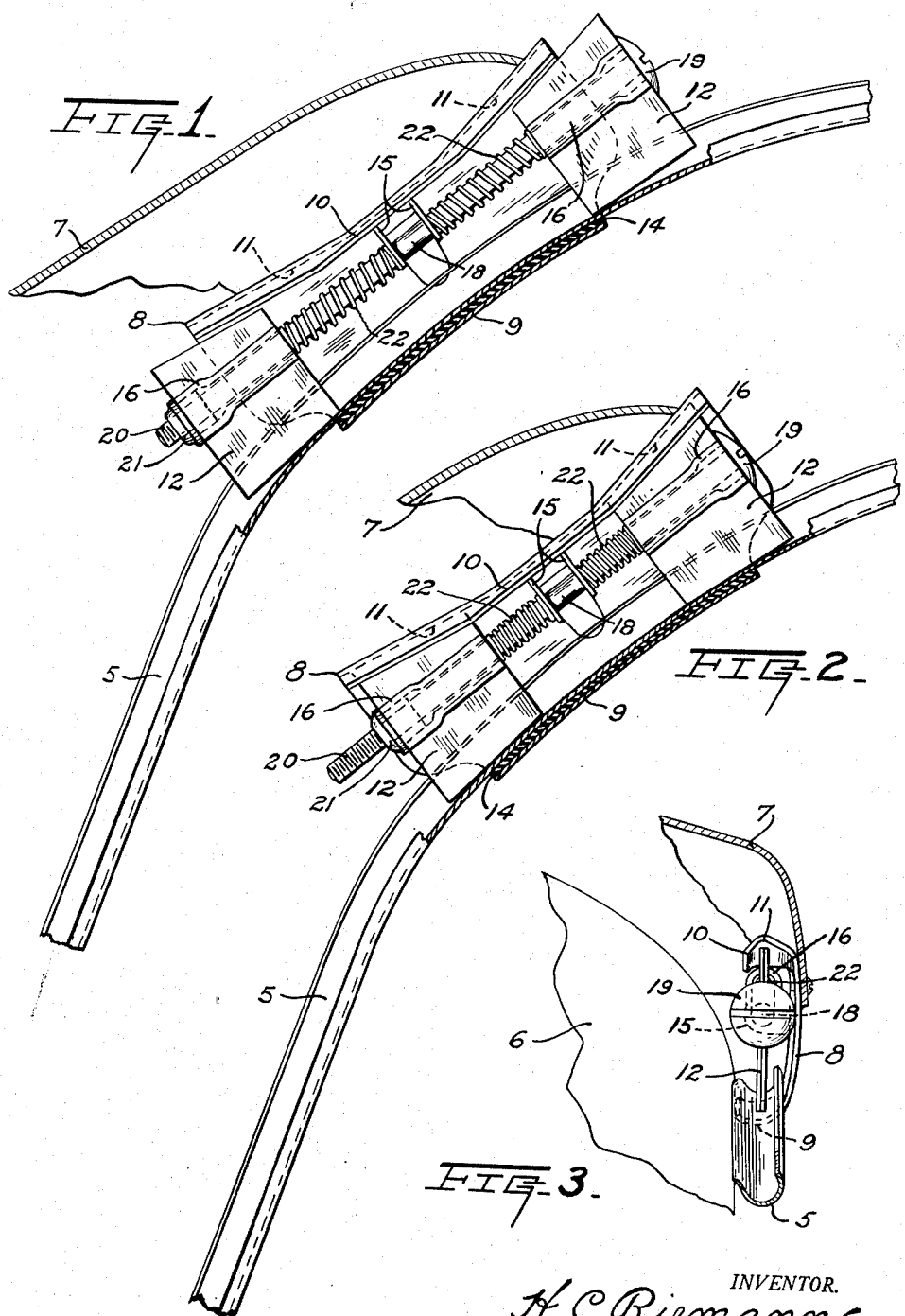
INVENTOR.
H. C. Riemann
BY
Lieber & Lieber
ATTORNEYS.

Patented Mar. 23, 1954

2,673,055

UNITED STATES PATENT OFFICE 2,673,055

ATTACHMENT FOR AUTOMOBILE ACCESSORIES

Howard C. Riemann, West Allis, Wis., assignor to The Fulton Company, West Allis, Wis., a corporation of Wisconsin Application January 18, 1950, Serial No. 139,150

4 Claims. (Cl. 248—226)

1

The present invention relates in general to improvements in devices for attaching accessories to vehicles or the like, and relates more specifically to improvements in the construction and operation mechanism for clamping diverse attachments to the rain gutters of enclosed automobiles.

The primary object of my invention is to provide an improved attachment for automobile accessories or the like, which is simple and durable in construction, conveniently applicable, and effective in use.

It has heretofore been common practice to fasten various kinds of accessories such as windshield visors, luggage carriers, aerials and the like, to the drip or rain gutters of enclosed automobiles and other vehicles, with the aid of screws and friction clamps. While the former screw attachments may be relatively effective, they necessitate marring of the vehicle finish due to the drilling and tapping of holes; and the prior friction clamps used for this purpose were either too complicated and difficult to apply, or they tended to become loose due to vibration of the automobiles while in use. None of these prior fastenings have therefore proven entirely satisfactory and sufficiently effective for various reasons.

It is therefore an important object of the present invention to provide an improved fastener for attaching accessories to automobile rain gutters or the like, without marring the vehicle finish and in most effective and convenient manner.

Another important object of this invention is to provide an attachment for accessories, which can be readily and firmly applied to either longitudinally curved and relatively straight portions of automobile rain gutters, without requiring the drilling of holes.

A further important object of the invention is to provide a simple accessory attaching clamp which may be constructed at moderate cost from sheet metal with the aid of punches and dies, and which may be conveniently manipulated to either attach or release the accessory.

Still another object of my invention is to provide a durable mechanism for clamping diverse accessories to the rain gutters of automobiles by merely manipulating a single screw, and which will not become loose due to vibration and do not undesirably obstruct the gutters.

An additional object of my present invention is to provide an improved accessory mounting bracket adapted to be rigidly secured with the aid of several clamping wedges to either straight

2 or irregular gutters or the like, and which may be shifted or adjusted along the gutters at will.

These and other objects and advantages of the invention will be apparent from the following detailed description.

A clear conception of the improved features involved in my present improvement, and of the construction and operation of a typical gutter type visor attachment embodying the invention, may be had by referring to the drawing accompanying and forming a part of this specification wherein like reference characters designate the same or similar parts in the various views.

Fig. 1 is an inside view of one of the improved gutter attachments showing the same loosely applied to a typical automobile gutter and supporting a fragment of a windshield visor, the lower flange of the attachment and a portion of the gutter being shown in section;

Fig. 2 is a view of the same attachment, similar to that of Fig. 1, but showing the bracket of the attachment firmly clamped to the gutter; and Fig. 3 is an end view of the same attachment finally applied, showing the gutter and visor fragment in section.

The gist of my present invention is the provision of a double wedge bracket or accessory support which may be frictionally clamped to either straight or longitudinally curved gutters or the like, to firmly secure the support to the gutter, and while the improvement has been specifically shown as being advantageously applicable to windshield visor mountings, it is not my desire or intent to unnecessarily restrict the improved features to such use; and it is furthermore contemplated that descriptive terms employed herein be given the broadest possible interpretation consistent with the disclosure.

Referring to the drawing, the improved gutter attachment for vehicle accessories shown therein is especially adapted for cooperation with either side rain gutter 5 of any automobile enclosure or body 6 to support an accessory such as a windshield visor 7, and the attachment comprises in general, a sturdy frame or bracket 8 having a lower flange 9 adapted for disposition beneath the gutter 5 and also having an upper flange 10 provided with oppositely inclined end surfaces 11 reaching over the upwardly open interior of the same gutter; a thin flat wedge 12 coacting with each of the inclined surfaces 11 and with the interior of the gutter 5; and means for moving the wedges 12 along the adjacent surfaces 11 to either force the lower flange 9 into clamping engagement with the bottom of the gutter 5, or to release the wedges 12.

The frame or bracket 8 together with its laterally projecting lower and upper flanges 9, 10 may be formed of a single piece of relatively heavy sheet metal with the aid of punches and dies, and the visor 7 or other accessory may be either rigidly or pivotally adjustably attached to two of these brackets 8 cooperable with the gutters 5 on opposite sides of the body 6. The lower clamping flange 9 of the bracket 8 may be either continuous as shown or medially interrupted, and is preferably curved longitudinally so as to permit its application to either curved or straight portions of the gutters 5, and if so desired, a pad 14 of rubber or felt may be applied between this flange 9 and the adjacent gutter 5 in order to avoid marring of the finish of the vehicle. The surfaces 11 are preferably straight but slightly inclined longitudinally of and downwardly toward the lower flange 9, and a bearing element 15 formed of sheet metal or otherwise may be firmly attached to the inside of the bracket 8 between the surfaces 11 in any suitable manner.

The two wedges 12 of each clamp assembly may be of interchangeably similar construction and each of these wedges 12 may be formed of two relatively thin sheet metal sections welded or otherwise secured together and having cooperating medial bulges forming tubular hubs 16. The outer inclined edges of the oppositely directed wedges 12 are slidably cooperable with the adjacent similarly inclined bracket surfaces 11, while the opposite edges of these wedges 12 are likewise cooperable with the upper inner surface of the gutter 5 with which the clamp coacts. The two wedges may also be produced with the aid of simple punches and dies, and are normally disposed parallel to the side wall of the bracket approximately equi-distant from the central bearing element 15 secured to the inside of this bracket.

The means for moving the wedges 12 along the adjacent inclined surfaces 11, consists primarily of a screw or bolt 18 having its medial portion journalled for rotation in the bracket element 15 while one end thereof is provided with a manipulating head 19 coacting with the outer end of one wedge hub 16 while its opposite end has screw threads 20 formed thereon; a nut 21 coacting with the screw threads 20 of the bolt 18 and with the outer end of the other wedge hub 16; and a helical compression spring 22 interposed between the inner end of each wedge hub 16 and the medial element 15. This wedge moving mechanism is such that the elongated bolt 18 is rotatable with the aid of a screw driver within the journal element 15 and wedge hubs 16, and when the bolt 18 is rotated in one direction both wedges will obviously be drawn inwardly toward each other to compress the springs 22, whereas rotation of the bolt 18 in the opposite direction will cause the compressed springs 22 to move the wedges apart.

When the improved gutter clamping units have been properly constructed and secured to a windshield visor 7 or other accessory which is to be attached to the vehicle gutters 5, the wedges 12 should be initially separated or retracted as illustrated in Fig. 1, whereupon the lower flanges 9 of the two brackets 8 may be hooked beneath the adjacent gutters 5 and the wedges 12 may be loosely disposed within these gutters. After each released clamp assembly has been slid along the adjacent gutter 5 to the desired position, the bolt 18 may be rotated with the aid of a screw driver applied to its head 19, so as to simultaneously move the two wedges 12 toward each other and to thereby firmly clamp the lower flange 9 of the bracket against the bottom of the gutter 5 as indicated in Fig. 2. The lower edges of the two wedges 12 will then firmly engage the upper surface of the gutter 5 while the springs 22 will be compressed; and if it becomes desirable to release one or both of the clamping assemblages, it is only necessary to rotate the bolt 18 thereof in the opposite direction whereupon the compressed springs 22 will become quickly effective to spread the wedges 12 apart.

From the foregoing detailed description of the construction and operation of the improved accessory attachment, it should be apparent that I have in fact provided a simple unit for effectively and conveniently clamping various kinds of accessories to the rain gutters 5 of automobile tops 6 or the like, without marring the finish. The improved structures will effectively cooperate with straight or longitudinally curved portions of the gutters, and may be quickly applied or released with little effort. The relatively thin wedges 12 also avoid undesirable obstruction of the interiors of the gutters 5 with which they coact, and permit free adjustment of the clamping units along these gutters, and the wedges 12 as well the bracket 8 may be readily constructed at moderate cost from durable sheet metal with the aid of punches and dies. The improved clamps have proven highly satisfactory and successful in actual use especially for attaching windshield visors 7 to vehicle gutters 5, but may obviously be utilized for other purposes.

It should be understood that it is not desired to limit this invention to the exact details of construction and operation of the specific clamp assemblages herein shown and described, for various modifications within the scope of the appended claims may occur to persons skilled in the art.

I claim:

1. In a gutter attachment, a bracket having lower and upper flanges projecting therefrom in the same direction, the lower flange being longitudinally curved and formed for disposition beneath the gutter and the upper flange having thereon oppositely inclined surfaces facing the upwardly open interior of the gutter, a wedge interposed between each of said inclined surfaces and the gutter interior, a bolt journalled on said bracket and rotatable in one direction to draw both of said wedges toward each other along the adjacent inclined surfaces to force said lower flange into clamping engagement with the gutter, and springs interposed between said wedges for separating the same when said bolt is reversely rotated.

2. In a gutter attachment, a sheet metal bracket having lower and upper integral flanges projecting therefrom in the same direction, the lower flange being formed for disposition beneath the gutter and the upper flange having thereon oppositely inclined surfaces facing the upwardly open interior of the gutter, a sheet metal wedge interposed between each of said inclined surfaces and the gutter interior, a journal element secured to said bracket between said wedges, a bolt journalled in said element and being rotatable in one direction to draw both of said wedges along the adjacent inclined surfaces and toward each other to force said lower flange into clamping engagement with the gutter near the opposite ends of said bracket, and a spring interposed between said element and each of said wedges for spreading the latter apart when said bolt is rotated in the opposite direction.

3. In a gutter attachment, a bracket having flanges projecting therefrom in the same direction and also having a journal element fixedly associated therewith between said flanges, one of said flanges being formed for disposition beneath the gutter and the other flange having thereon oppositely inclined surfaces facing the open interior of the gutter, a wedge interposed between each of said inclined surfaces and the gutter interior, a bolt journalled for rotation in said element between said wedges and coacting with the latter to draw both wedges toward each other along the adjacent inclined surfaces and to thereby force said first mentioned flange into clamping engagement with the gutter, and a helical spring surrounding said bolt on each of the opposite sides of said element and coacting with said wedges to separate the same when said bolt is manipulated to release the clamping action.

4. In a gutter attachment, a bracket having flanges projecting therefrom in the same direction and also having a fixed journal element between said flanges, one of said flanges being formed for disposition beneath the gutter and the other flange having thereon oppositely inclined surfaces facing the open interior of the gutter, a wedge interposed between each of said inclined surfaces and the gutter interior on each of the opposite sides of said element, a bolt journalled for rotation in said element and being rotatable in one direction to draw both wedges toward said fixed element along the adjacent inclined surfaces and to thereby force said first mentioned flange into clamping engagement with the gutter, and resilient means surrounding said bolt on each of the opposite sides of said fixed element and coacting with said wedges to separate the same when said bolt is rotated in the opposite direction.

HOWARD C. RIEMANN.

References Cited in the file of this patent

UNITED STATES PATENTS

| Number | Name | Date |
|---|---|---|
| 391,508 | Burk | Oct. 23, 1888 |
| 768,694 | Rich | Aug. 30, 1904 |
| 2,080,261 | Funk | May 11, 1937 |
| 2,087,217 | Cohen | July 13, 1937 |
| 2,180,909 | Peckat | Nov. 21, 1939 |
| 2,291,747 | Neuwirth | Aug. 4, 1942 |